United States Patent [19]

Peters

[11] 4,274,365

[45] Jun. 23, 1981

[54] AUTOMATIC WATERING DEVICE

[76] Inventor: William H. Peters, R.R. #3, Bryan, Ohio 43506

[21] Appl. No.: 149,575

[22] Filed: May 14, 1980

[51] Int. Cl.³ .............................................. A01K 7/00
[52] U.S. Cl. ..................................... 119/78; 137/426
[58] Field of Search .................................. 119/78–80, 119/73; 137/426, 448

[56] References Cited

U.S. PATENT DOCUMENTS 3,138,140  6/1964  Byrd ........................................ 119/80

Primary Examiner—Jay N. Eskovitz
Attorney, Agent, or Firm—Shoemaker and Mattare, Ltd.

[57] ABSTRACT

A device for automatically maintaining a supply of clean, fresh water for animals, or the like. The device includes a basin fluidly connected to a trough by a slot which has sides that are partly undulating and partly straight. A flow control mechanism is movably mounted in the slot to fluidly connect that basin to a source of water.

10 Claims, 8 Drawing Figures

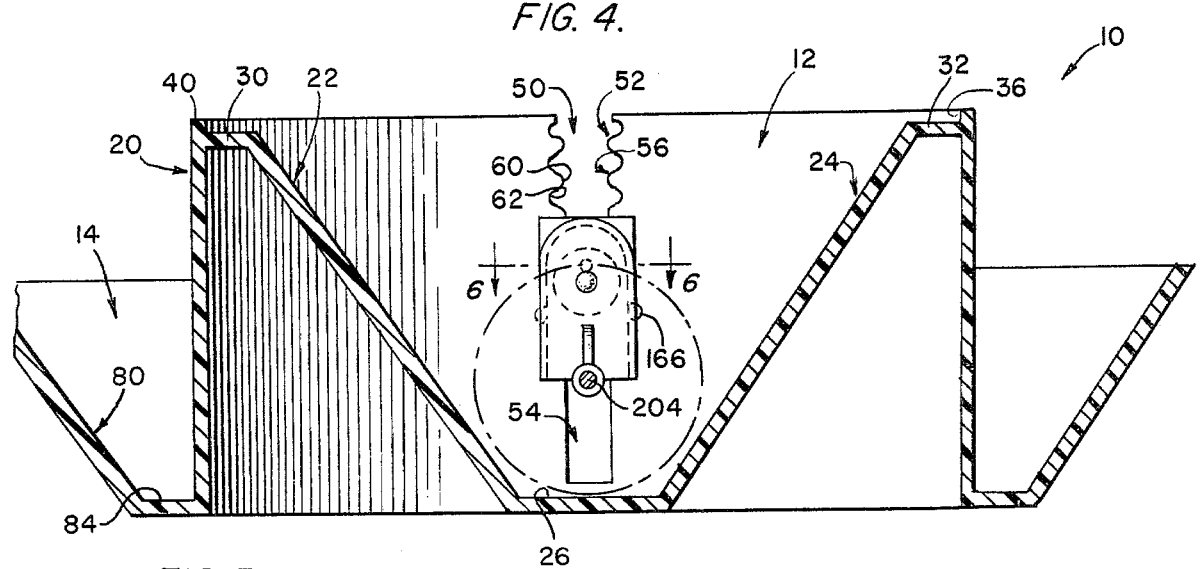
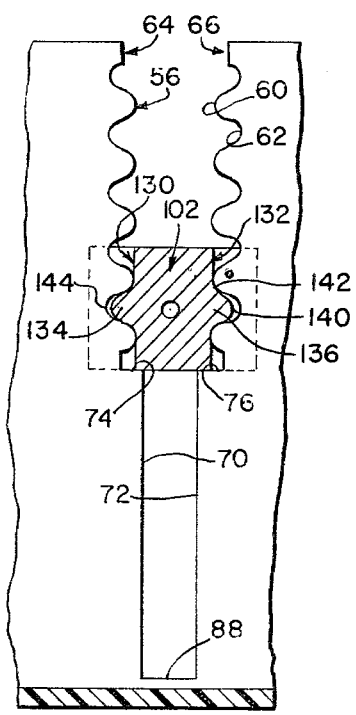
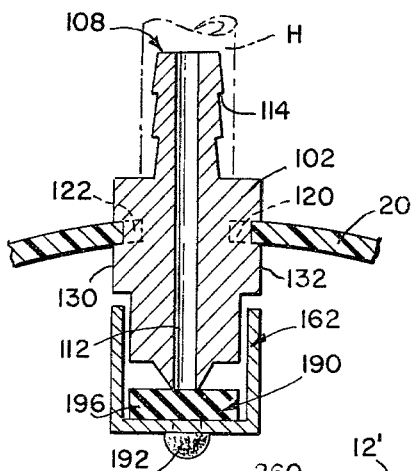
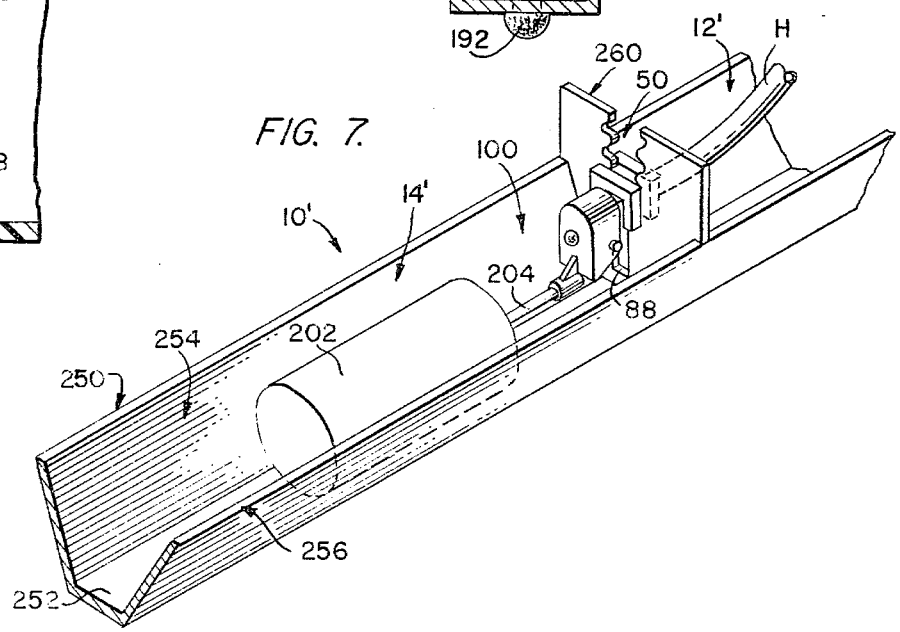

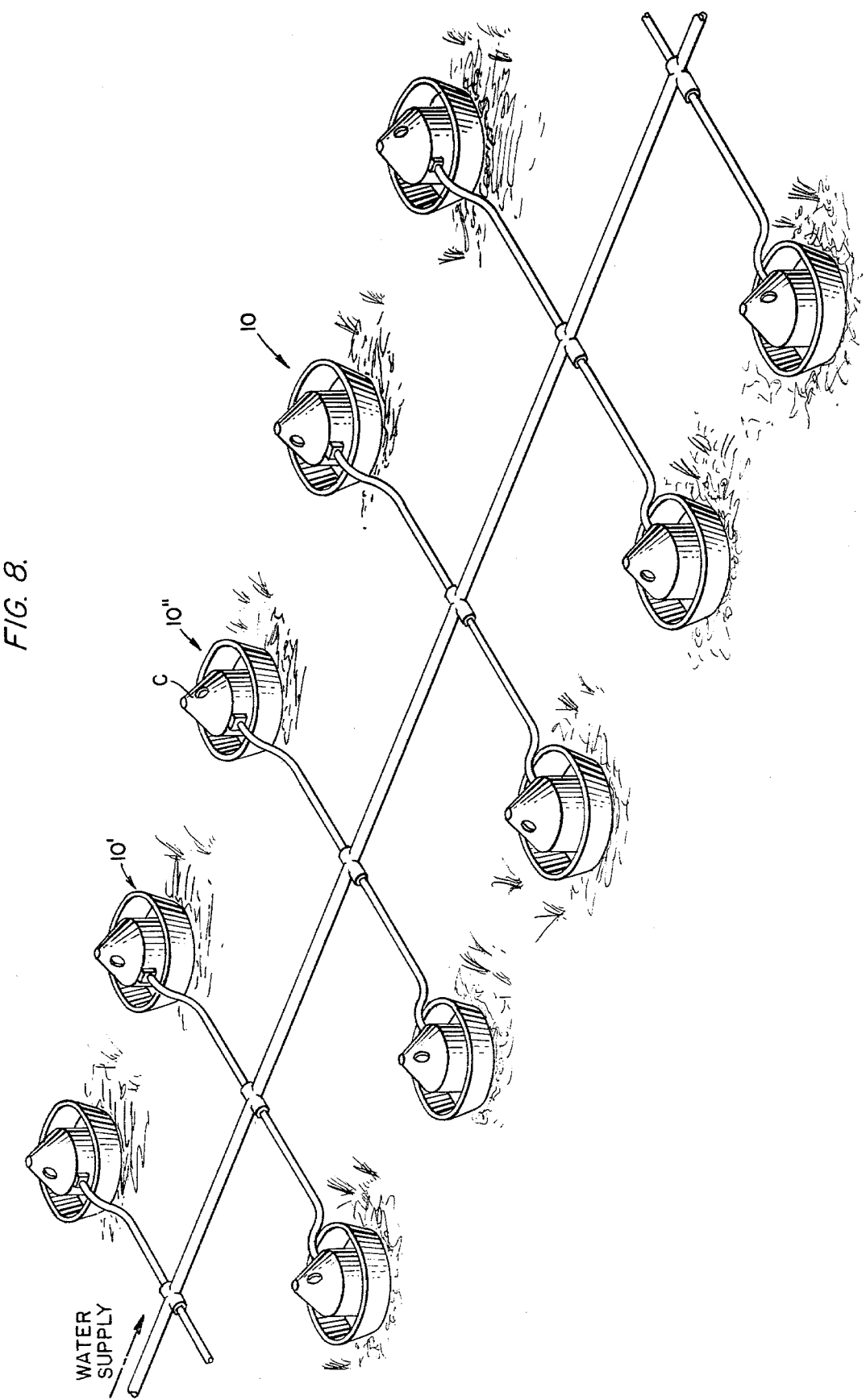

AUTOMATIC WATERING DEVICE

BACKGROUND OF THE INVENTION

The present invention relates in general to water providing devices, and, more particularly, to devices which provide drinking water to animals.

Animal husbandry requires provision of a source of water to the subject animals. This is particularly important in the area of raising chickens, birds, or other such animals. This water supply should be clean and always readily available to the animals. Preferably, the water should be supplied in a manner which prevents stagnation or contamination. Furthermore, the means for providing such water should be easy to assemble and disassemble, as well as inexpensive and reliable, as well as energy efficient.

Ease of assembly permits cleaning and repair of the device to be expeditiously effected.

There are devices known for controlling water level in drinking fountains, such as that device disclosed in U.S. Pat. No. 2,662,503, and there are devices known for providing water to animal stock. However, there is no device known which is easily assembled and which reliably provides a desired amount of clean, fresh water to animal stock.

SUMMARY OF THE INVENTION

The device embodying the teachings of the present invention includes means for automatically providing a controlled amount of drinking water to chickens, fowl, birds, or the like. The means includes a float-controlled valve operating with a means for distributing liquid to an area making that liquid available for consumption. Consumption of the liquid and evaporation thereof reduces the liquid level, thereby causing the valve to operate and permitting replacement of the water with fresh, clean water.

The presently disclosed valve includes an adjustment means to control the water level, and also a means for automatically shutting the valve off. These means are provided without requiring an excessive number of parts. Thus, the ease of assembly and disassembly is expedited, and the overall expense of the device of the present invention is reduced as compared to known devices.

The device operates mechanically, thereby saving energy as well as providing an easily assembled and operated, reliable device.

It is further noted that because of the cooperation between the basin (or pan) proper, and the float valve proper, expensive items of application and construction heretofore used and required in this art are no longer needed. Known units require provision of a hole through a mounting member and provision of a threaded means on the valve body for a mounting nut. Then, labor is required to insert the valve in the mounting member using a wrench of proper design to apply the nut to the valve body until secured. Thus, the present unit is much less costly than prior units. The present unit also obviates the need to manufacture and apply a means of shutting the water off at the installation of this unit. The present unit also obviates the need to manufacture and apply a means to control the water level, which on prior units must be manufactured and applied.

OBJECTS OF THE INVENTION

It is a main object of the present invention to provide controlled amounts of clean, fresh water to livestock.

It is another object of the present invention to provide controlled amounts of clean, fresh water to livestock in an efficient manner.

It is a further object of the present invention to provide controlled amounts of clean, fresh water to livestock using a device which is easily assembled and disassembled.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 4 is a view taken along line 4—4 of FIG. 2.

FIG. 5 is a view taken along line 5—5 of FIG. 2.

FIG. 6 is a view taken along line 6—6 of FIG. 4.

FIG. 7 is a perspective of an alternative embodiment of the device embodying the teachings of the present invention.

FIG. 8 is a perspective showing a plurality of fluidly connected units embodying the teachings of the present invention.

DETAILED DESCRIPTION OF THE INVENTION

Figure 1:
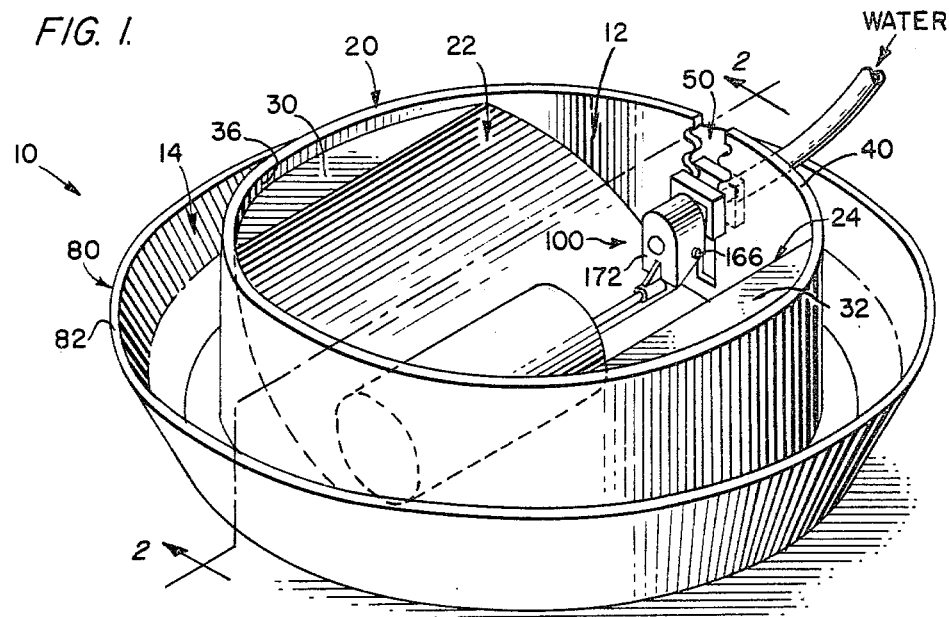
FIG. 1 is a perspective of a device embodying the teachings of the present invention.

Shown in FIGS. 1 and 4 is a watering device 10 having a central basin 12 and an outer trough 14. The central basin 12 includes an annular vertical wall 20 surrounding a pair of trough defining inclined planes 22 and 24 which converge inwardly of the vertical wall 20. The planes intersect a bottom 26 of the central basin at locations spaced from each other as best shown in FIG. 4. The planes are on secants of the wall 20 and shoulders 30 and 32 are defined between the top of the planes and vertical wall inner surface 36. The shoulders are spaced from top rim 40 of the vertical wall.

Figure 3:
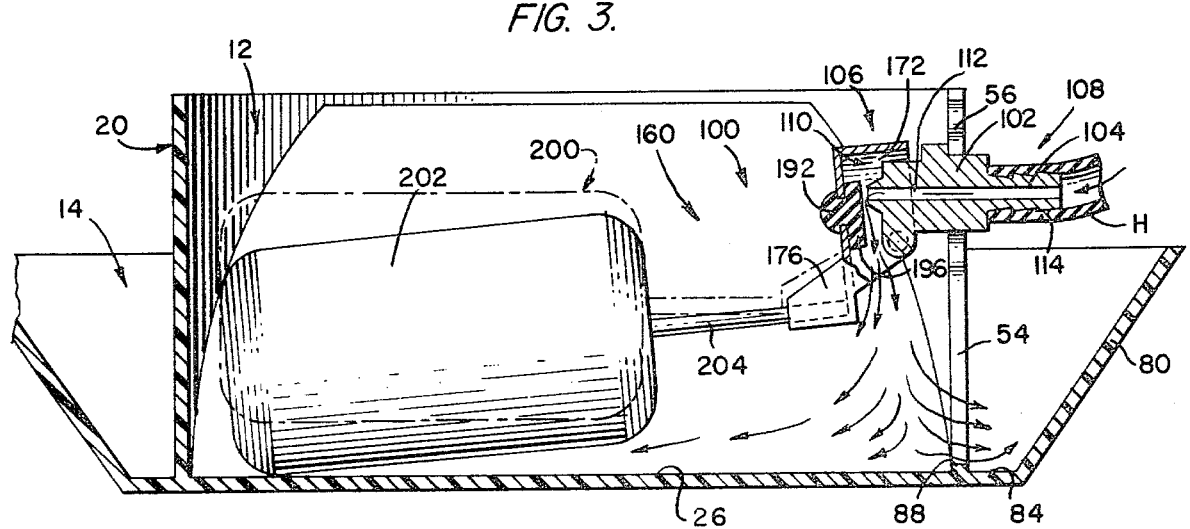
FIG. 3 is a view similar to FIG. 2 showing the device in an open orientation.

A slot 50 is defined in the vertical wall, and extends from the top rim to a location adjacent, but spaced from, the basin bottom 26 as best shown in FIG. 3. The slot 50 includes a sinuous portion 52 at the top and a smooth portion 54 at the bottom. The sinuous portion includes undulations 56 on each side wall of the slot which include crests 60 and valleys 62 to define a sinusoidal shape. As best shown in FIG. 5, the crests and valleys of one slot side wall 64 are all co-level with corresponding crests and valleys of the other slot side wall 66.

The slot has smooth wall portions 70 and 72 beneath the sinuous portions, as best shown in FIG. 5. The smooth wall portions are spaced from each other a distance slightly less than the spacing between the crests 60 for a purpose which will be evident from the ensuing discussion. Shoulders 74 and 76 are defined at the intersection of the smooth and sinuous wall portions.

As best shown in FIGS. 1 and 4, the trough 14 includes an annular wall 80 circumambient the vertical wall and spaced therefrom. The wall 80 is sloped and is inwardly declining toward the vertical wall from top rim 82 of the wall 80 to trough bottom 84 which is integral with both walls 20 and 80. The slot 50 provides fluid communication between the basin 12 and the trough 14 with a portion of the vertical wall between the slot and the bottom 26 forming a weir 88 for a purpose which will be discussed below. As shown in FIG. 4, the bottoms 26 and 84 are co-planar.

A water supply mechanism 100 is movably mounted in the slot 50. The mechanism 100 includes an elongate body 102 mounted in the slot, a hose coupling 104 integrally connected to the body and a control mechanism 106 integrally connected to the body. The body has an outboard end 108 and an inboard end 110, and a fluid passage 112 is defined to extend longitudinally through the body from the outboard end to the inboard end thereof, and the hose coupling includes shoulders 114 or the like to maintain a water supply hose H coupled to the body in fluid communication with the passage 112, and hence in fluid communication with the basin.

As best shown in FIG. 6, the body 102 has a pair of wall accommodating gaps 120 and 122 defined therein for accommodating the wall 20 on each side of the slot 50. The body 102 thus spans the slot and extends therethrough to provide fluid communication between the hose H and the basin 12, while the slot 50 provides fluid communication between the basin and the trough. Thus, fluid communication between a water supply and the trough is established via the hose H, fluid passage 112, basin 12 and the slot 50.

As best shown in FIG. 5, the body 102 includes longitudinal sides 130 and 132, and arcuate shoulder defining strips 134 and 136 on the sides 130 and 132, respectively. The strips 134 and 136 are located essentially medially of the body sides and have lengths which exceed the thickness of the vertical wall. The strips have crests 140 and bases 142 with the height of each strip, as measured between the crest and the base, being slightly less than the height of the crests 56 as similarly measured so that gaps 144 are defined between the crests 140 and the valleys 62.

Contact between the crests 60 and the bases 142 maintains the body 102 in position in the slot at a desired elevation above the bottom 26. Movement of the body 102 is effected by disengaging the meshed body strips and slot undulations, and moving the body up and down in the slot. The cooperation between the crests of the undulations and the bearing surface of the valve body prevents rotation of that valve body. The shoulders 74 and 76 define the lower limit of movement of the body 102.

Figure 2:
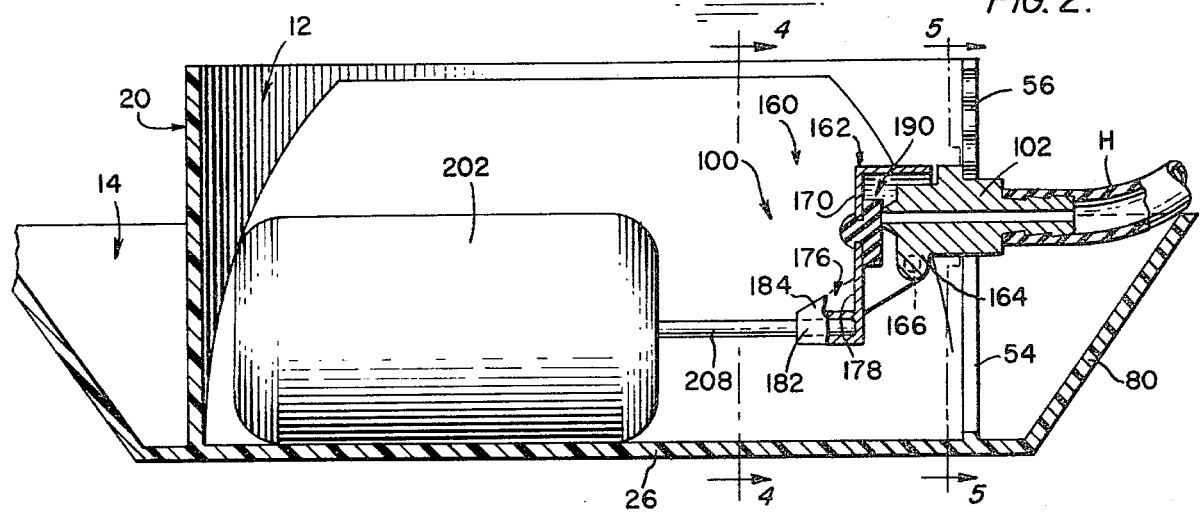
FIG. 2 is a view taken along line 2—2 of FIG. 1 showing the device in a closed orientation.

A flow control mechanism 160 is connected to the inboard end 110 of the body 102, and is best shown in FIGS. 2 and 3. The mechanism 160 includes a housing 162 pivotally coupled to extension 164 of the body 102 by a pintle 166, or the like. The housing is tubular with a planar front wall 170 and an arcuate side wall 172 integrally connected together.

A bracket 176 is integrally mounted on the housing to extend forwardly of outer surface 178 of the front wall 170 into the basin 12. The bracket 176 includes a tubular sleeve 182 and a fillet 184, and pivots on the pintle between the FIG. 2 and FIG. 3 positions.

A fluid passage occluding stopper 190 is mounted on the housing front wall 170 and includes a mounting boss 192 received in a mounting hole defined in the wall 170 and a body 196 integrally connected to the boss and located inside the housing to cover the inboard end of the fluid passage 112 when the mechanism 160 is in the FIG. 2 position. Preferably, the body 196 is circular and is mounted off-center so that wear can be compensated for by rotating the stop about the eccentric axis defined by the off-center mounted boss 192. The off-center mounting of the stopper is shown in FIGS. 2 and 3.

A float mechanism 200 is attached to the housing via the bracket 176, and includes a float 202 attached to a float arm 204 at one end of that arm. The arm is attached at the other end thereof to the bracket 176. The float is located between the inclined planes as best shown in FIGS. 1 and 4.

When the float is in the FIG. 3 position, water from hose H flows from the passage 112 into the basin 12 as indicated by the arrows F in FIG. 3. This water then flows over the weir 88 and through the slot 50 into the trough 14. The water level within the basin and trough rises as the water flows thereinto. As the water level rises, the float 202 rises from the FIG. 3 open position towards the dynamic indication float 200 FIG. 3 closed position. When the water level rises to a predetermined level, the float causes the stopper to occlude the fluid passage, thereby automatically shutting off flow. When the water level in the device 10 drops to a predetermined level, the weight of the float will cause the stopper to open the fluid passage 112 to thereby replenish the water supply in the basin and trough with clean, fresh water. Accordingly, a desired amount of water can be constantly maintained in the trough without danger of stagnation. The water level can be kept quite low to prevent the afore-mentioned stagnation without danger of the water supply becoming exhausted because the water in the trough is automatically replenished when the water level in the trough and the basin drops below a predetermined setting.

In the trade, i.e., field application, it is desirable with watering devices, and sometimes a must, to have a device to shut the water supply off to the watering unit, inasmuch as it must be cleaned, repaired, or different arrangements made, and the like. When the birds outgrow the usefulness of these units, the units are raised by wires to the top of the houses, or ceilings, to be out of the way, and more adult-type watering devices are used. The FIG. 1 unit is used primarily for baby fowl, but the chicks grow to maturity in the same building. These units are strung through the length of the house as shown in FIG. 8, where the units are shown as including caps C.

FIG. 2 shows body 102 resting on shoulders 74 and 76 and the determination of the altitude of the shoulders 74 and 76 is in direct reference to rotation of hood 162 and pintle 166 and the contact point of float 202 on the bottom of basin 26 to specifically affect the stopper 190 closing the basin. In other words, the combination of these designed events shuts the water off at each individual unit when so desired without affecting the operation of the other units within a given installation. Thus, unit 10' in FIG. 8 can be shut off without affecting the operation of an adjacent unit 10". This result is not possible using known devices.

It is further noted that to attain this FIG. 3 position, the body 102 has been moved vertically to a preselected altitude in the undulating segments, and up from the shoulders 74 and 76, which permits dynamic movement of the float, and rotation on the aforesaid hood allowing the engress of water to control the shut-off stopper. In contrast, when the valve body 102 is moved down to rest on the shoulders 74 and 76, the float strikes the bottom of the basin, rotating the stopper to a shut-off position, and the valve body strips 134 and 136 are locked in the undulations and everything is static and locked up, or shut off.

By vertically shifting the body 102 in the slot 50, the desired water level in the device 10, and hence in the trough 14, can be adjusted. FIG. 2 represents the closed configuration of the device, that is, the float rests on the bottom 26 while the stopper still occludes the passage 112. FIG. 3 represents the lower level of water in the device, that is, the passage is just opened when the float contacts the bottom 26. Other configurations are possible without departing from the scope of the present invention, and will occur to those skilled in the art based on the teachings of the present disclosure. No limitation is intended by the omission of a description of possible configurations.

The weir 88 prevents dirt or other sediment from passing from the basin into the trough, thereby maintaining the water in the trough, which water is to be consumed, uncontaminated.

An alternative embodiment of the device 10 is shown in FIG. 7, and is indicated by the reference numeral 10'. The device 10' includes an elongate V-type watering conduit 250 having a base 252 and upwardly divergent planar side walls 254 and 256.

A planar septum 260 is mounted in the conduit and has a slot 50 defined therein. The septum supports the water supply mechanism 100 to be oriented longitudinally and axially of the conduit. A weir 88 is defined adjacent the bottom of the slot 50. The device 10' operates in a manner similar to the operation of the device 10, and maintains water in the conduit 250 at a desired level. The trough section of the device 10' is indicated by the reference numeral 12', and the basin portion of that device is represented by the reference numeral 14'. The two portions can be as long as desired, and end walls (not shown) define the length of such sections. The undefined length of the conduit and basin sections of the device 10' is represented in FIG. 7 by the cutaway nature of that figure.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A device for automatically providing controlled amounts of clean, fresh drinking water to livestock, and the like, comprising:
   a basin;
   a trough attached to said basin;
   a partition separating said basin and said trough;
   a slot defined in said partition, said slot establishing fluid communication between said basin and said trough and having side walls which each include a first undulating portion and a second straight portion;
   water supply means fluidly connected to said basin;
   flow control means fluidly interposed between said water supply means and said basin to control the flow of liquid into said basin from said water supply means, said flow control means including a body movably mounted in said slot and having a fluid passage defined therethrough, a housing pivotally mounted on said body in said basin, a stopper mounted on said housing to occlude said fluid passage when a water level in said basin reaches a desired level, and a float attached to said housing and located within said basin for sensing the liquid level in said basin and for moving said stopper over said fluid passage to prevent further liquid from entering said basin via said passage when the liquid level in said basin reaches a predetermined level and for moving said stopper away from said fluid passage when the liquid level in said basin drops below a predetermined level to permit replenishing of the water in said basin and said trough.

2. The device defined in claim 1 wherein said trough section is annular.

3. The device defined in claim 1 wherein said partition is annular.

4. The device defined in claim 1 wherein said trough and basin are elongate and axially aligned.

5. The device defined in claim 4 wherein said partition is planar.

6. The device defined in claim 1 further including a weir in said partition adjacent said slot.

7. The device defined in claim 1 wherein said flow control means body includes extension means for meshing with said slot side wall undulating portions.

8. The device defined in claim 7 wherein said extension means includes strips on said body.

9. The device defined in claim 1 wherein said basin includes a pair of inclined planes.

10. The device defined in claim 1 wherein said stopper is circular and is mounted off-center thereof.

* * * * *